United States Patent [19]
Brown et al.

[11] Patent Number: 5,864,516
[45] Date of Patent: Jan. 26, 1999

[54] VEHICLE ANIMAL REPELLING SYSTEM

[76] Inventors: William T. Brown; Tammie Brown, both of 26211 Old Hwy. 49, Saucier, Miss. 39574

[21] Appl. No.: 915,750

[22] Filed: Aug. 21, 1997

[51] Int. Cl.⁶ .................................................. A01M 29/02
[52] U.S. Cl. ............................................................ 367/139
[58] Field of Search ........................ 367/139; 116/22 A; 340/384.1, 384.2, 384.3

[56] References Cited

U.S. PATENT DOCUMENTS

| | | | |
|---|---|---|---|
| 4,386,341 | 5/1983 | Yamamoto | 367/139 |
| 4,475,102 | 10/1984 | Troy et al. | 340/385 |
| 5,214,619 | 5/1993 | Yoshida | 367/139 |
| 5,433,414 | 7/1995 | Viera | 248/316.4 |
| 5,602,523 | 2/1997 | Turchioe et al. | 340/384.2 |

*Primary Examiner*—Daniel T. Pihulic

[57] ABSTRACT

A new Vehicle Animal Repelling System for repelling unwanted animals from a vehicle. The inventive device includes a control unit, a plurality of exterior speakers electrically connected to the control unit, a solar panel electrically connected to the control unit and a frequency controller electrically connected to the exterior speakers.

5 Claims, 4 Drawing Sheets

VEHICLE ANIMAL REPELLING SYSTEM

BACKGROUND OF THE INVENTION

1. Field of the Invention

The present invention relates to Animal Repelling Devices and more particularly pertains to a new Vehicle Animal Repelling System for repelling unwanted animals from a vehicle.

2. Description of the Prior Art

The use of Animal Repelling Devices is known in the prior art. More specifically, Animal Repelling Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Animal Repelling Devices include U.S. Pat. No. 5,208,787; U.S. Pat. No. 4,484,315; U.S. Design Pat. No. 344,319; U.S. Pat. No. 4,616,351; U.S. Pat. No. 4,163,966 and U.S. Pat. No. 4,001,817.

While these devices fulfill their respective, particular objectives and requirements, the aforementioned patents do not disclose a new Vehicle Animal Repelling System. The inventive device includes a control unit, a plurality of exterior speakers electrically connected to the control unit, a solar panel electrically connected to the control unit and a frequency controller electrically connected to the exterior speakers.

In these respects, the Vehicle Animal Repelling System according to the present invention substantially departs from the conventional concepts and designs of the prior art, and in so doing provides an apparatus primarily developed for the purpose of repelling unwanted animals from a vehicle.

SUMMARY OF THE INVENTION

In view of the foregoing disadvantages inherent in the known types of Animal Repelling Devices now present in the prior art, the present invention provides a new Vehicle Animal Repelling System construction wherein the same can be utilized for repelling unwanted animals from a vehicle.

The general purpose of the present invention, which will be described subsequently in greater detail, is to provide a new Vehicle Animal Repelling System apparatus and method which has many of the advantages of the Animal Repelling Devices mentioned heretofore and many novel features that result in a new Vehicle Animal Repelling System which is not anticipated, rendered obvious, suggested, or even implied by any of the prior art Animal Repelling Devices, either alone or in any combination thereof.

To attain this, the present invention generally comprises a control unit, a plurality of exterior speakers electrically connected to the control unit, a solar panel electrically connected to the control unit and a frequency controller electrically connected to the exterior speakers.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Vehicle Animal Repelling System apparatus and method which has many of the advantages of the Animal Repelling Devices mentioned heretofore and many novel features that result in a new Vehicle Animal Repelling System which is not anticipated, rendered obvious, suggested, or even implied by any of the prior art Animal Repelling Devices, either alone or in any combination thereof.

It is another object of the present invention to provide a new Vehicle Animal Repelling System which may be easily and efficiently manufactured and marketed.

It is a further object of the present invention to provide a new Vehicle Animal Repelling System which is of a durable and reliable construction.

An even further object of the present invention is to provide a new Vehicle Animal Repelling System which is susceptible of a low cost of manufacture with regard to both materials and labor, and which accordingly is then susceptible of low prices of sale to the consuming public, thereby making such Vehicle Animal Repelling System economically available to the buying public.

Still yet another object of the present invention is to provide a new Vehicle Animal Repelling System which provides in the apparatuses and methods of the prior art some of the advantages thereof, while simultaneously overcoming some of the disadvantages normally associated therewith.

Still another object of the present invention is to provide a new Vehicle Animal Repelling System for repelling unwanted animals from a vehicle.

Yet another object of the present invention is to provide a new Vehicle Animal Repelling System which includes a control unit, a plurality of exterior speakers electrically connected to the control unit, a solar panel electrically connected to the control unit and a frequency controller electrically connected to the exterior speakers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
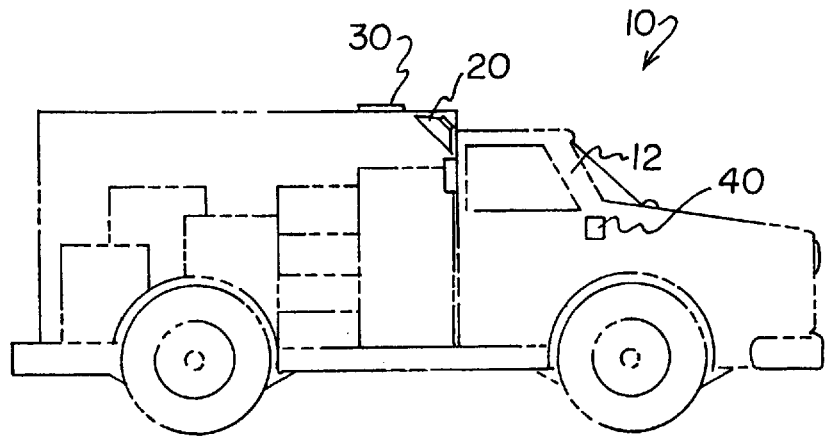
FIG. 1 is a side view of a new Vehicle Animal Repelling System according to the present invention.

With reference now to the drawings, and in particular to FIGS. 1 through 7 thereof, a new Vehicle Animal Repelling System embodying the principles and concepts of the present invention and generally designated by the reference numeral 10 will be described.

Figure 2:
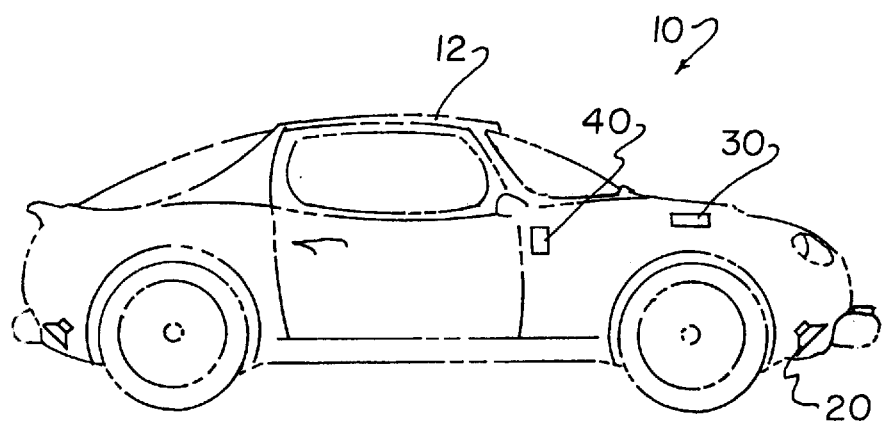
FIG. 2 is a side view of the present invention.
Figure 3:
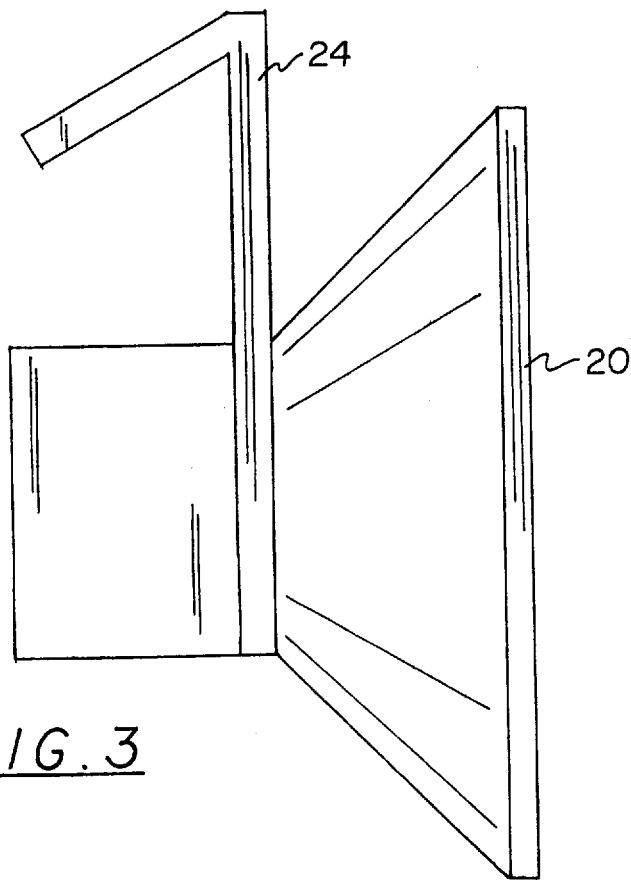
FIG. 3 is a side view of an exterior speaker and frequency controller.
Figure 4:
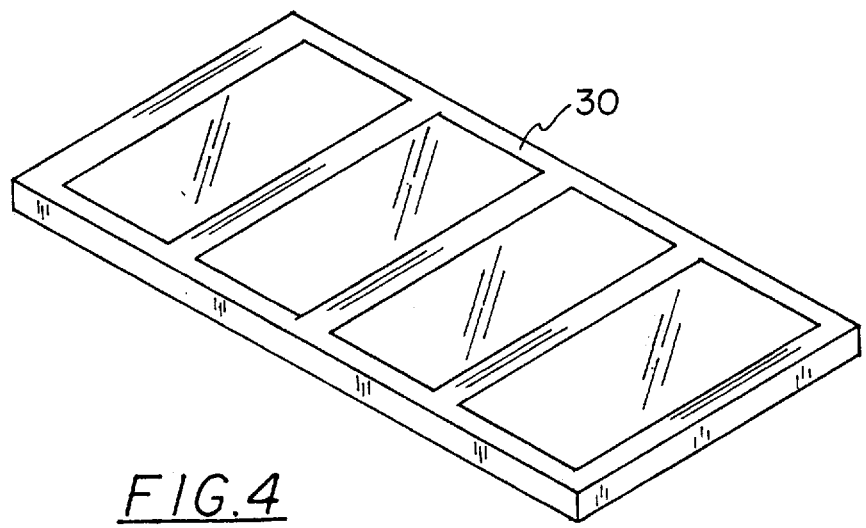
FIG. 4 is an upper perspective view of a solar panel.
Figure 5:
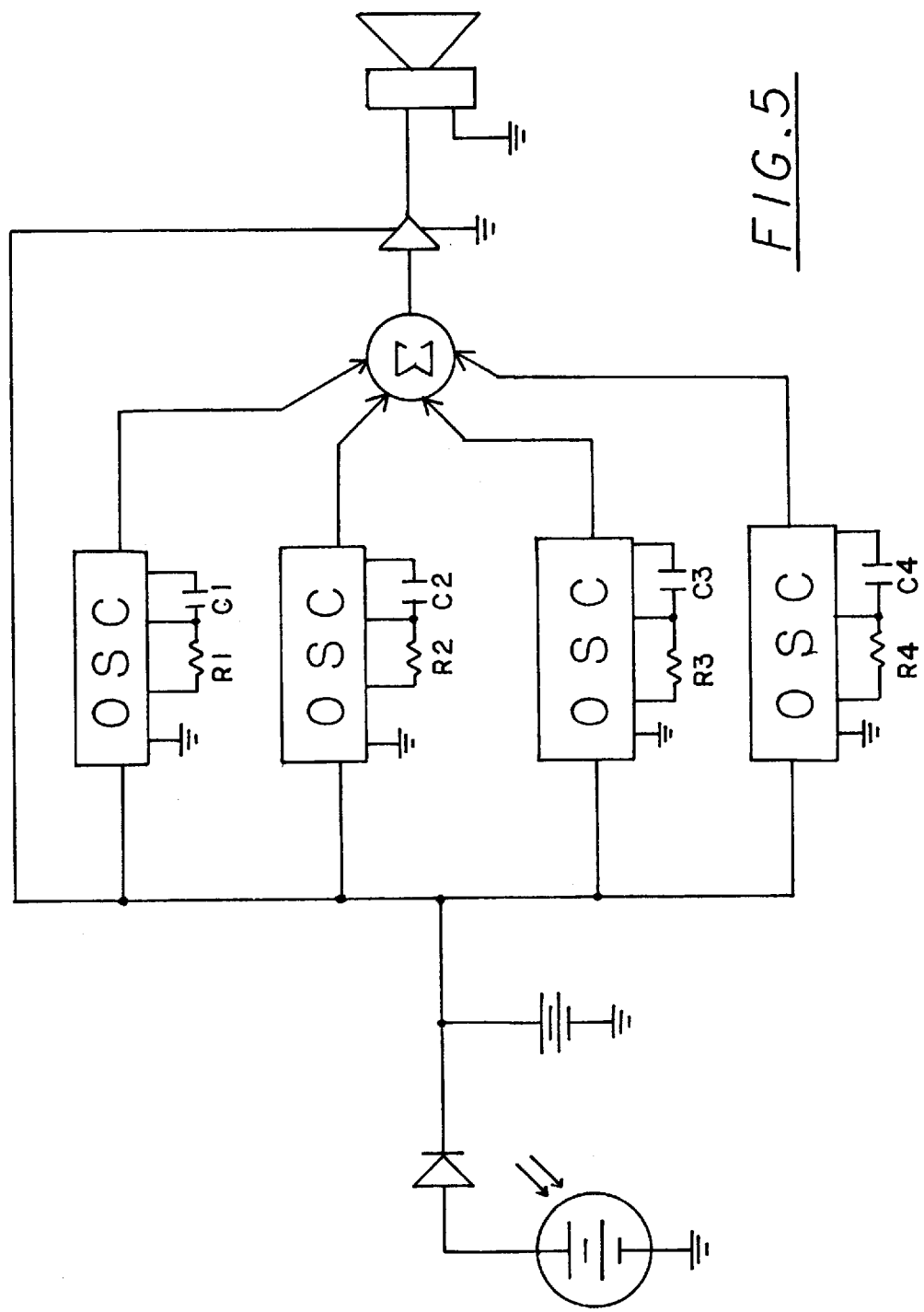
FIG. 5 is a schematic illustration of the present invention comprised of conventional circuitry.

More specifically, it will be noted that the Vehicle Animal Repelling System 10 comprises a control unit 40 capable of producing various frequencies which repel various animals, and at least one exterior speaker 20 electrically connected to the control unit 40 for audibly emitting the various frequencies and wherein the exterior speaker 20 is securable to a vehicle 12. As shown in FIGS. 1, 2 and 4 of the drawings, a solar panel 30 is electrically connected to the control unit 40 for providing electrical power to the control unit 40. The control unit 40 alternatively includes a battery source within for providing electrical power during darkness. The exterior speaker 20 includes a bracket 24 substantially L-shaped for securing to the vehicle 12 as shown in FIG. 3 of the drawings.

Figure 6:
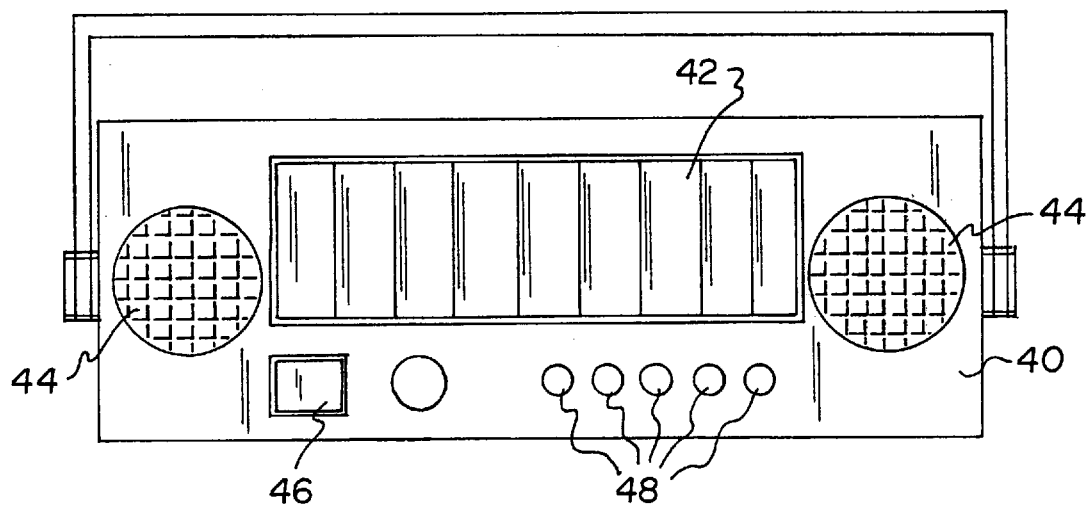
FIG. 6 is a front view of the control unit.
Figure 7:
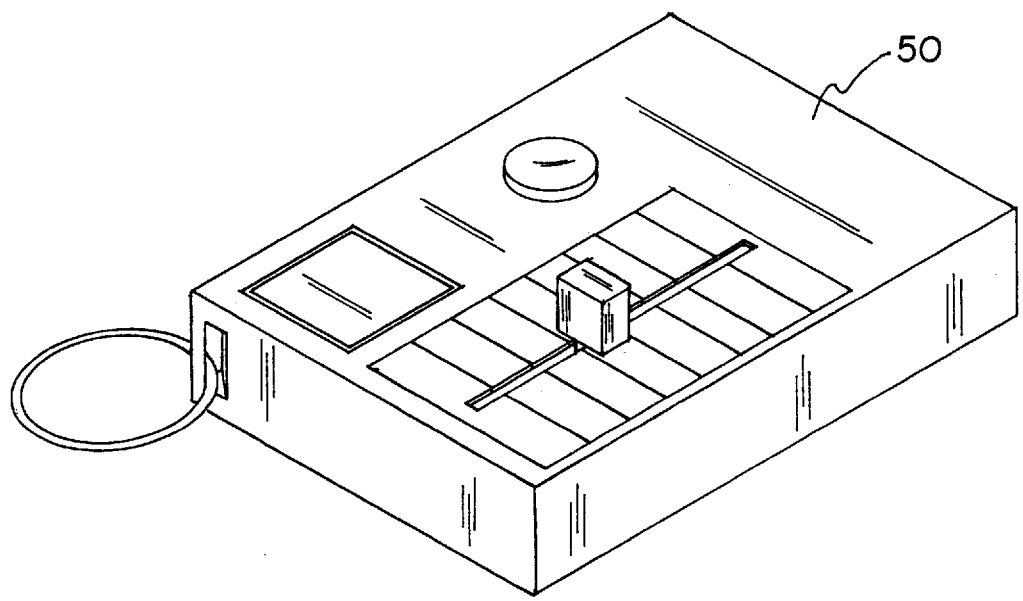
FIG. 7 is an upper perspective view of a remote frequency controller.

As shown in FIG. 6 of the drawings, the control unit 40 includes a plurality of frequency switches 42 for allowing a user to select a desired frequency from the various frequencies. Ideally, the frequency switches 42 are designed so that some or all of the frequency switches 42 may be activated at the same time so that a combination of frequencies are emitted simultaneously. The control unit 40 includes at least one interior speaker for audibly emitting the various frequencies within an interior portion of the vehicle 12 thereby repelling unwanted animals. Optionally, the exterior speaker 20 includes an intensity controller (not shown) for allowing adjustment of the audible emission. A remote frequency controller 50 is provided which is in radio communication with the control unit 40 for controlling the audible emission from the interior speakers 44.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicle animal repelling system comprising:

a control unit for producing selectable sound frequencies for repelling animals;

at least one exterior speaker electrically connected to said control unit, said speaker being for emitting a selected sound frequency, and wherein said exterior speaker is securable to a vehicle; and a solar panel electrically connected to said control unit for providing electrical power to said control unit;

wherein said control unit includes a battery for providing electrical power during darkness;

wherein said control unit includes a plurality of frequency switches for allowing a user to select a desired frequency; and wherein more than one of said frequency switches may be activated to permit emission of multiple frequencies simultaneously.

2. The vehicle animal repelling system of claim 1, wherein said control unit includes at least one interior speaker for emitting selectable sound frequencies audible to said selected animals, said interior speaker being for emitting said sound frequencies within an interior portion of said vehicle.

3. The vehicle animal repelling system of claim 2, including a remote frequency controller in radio communication with said control unit for controlling said emission from each said interior speaker.

4. The vehicle animal repelling system of claim 3, wherein said exterior speaker includes a substantially L-shaped bracket for securing said exterior speaker to said vehicle.

5. A vehicle animal repelling system comprising:

a control unit for producing selectable sound frequencies for repelling animals; and at least one exterior speaker electrically connected to said control unit, said speaker being for emitting a plurality of selectable sound frequencies, and wherein said exterior speaker is securable to a vehicle;

a solar panel electrically connected to said control unit for providing electrical power to said control unit;

wherein said control unit includes a battery for providing electrical power during darkness;

wherein said control unit includes a plurality of frequency switches for allowing a user to select a desired frequency;

wherein more than one of said frequency switches may be activated to permit emission of multiple frequencies simultaneously;

wherein said control unit includes at least one interior speaker for emitting selectable sound frequencies, said interior speaker being for emitting said sound frequencies within an interior portion of said vehicle;

a remote frequency controller in radio communication with said control unit for controlling said emission from each said interior speaker; and wherein said exterior speaker includes a substantially L-shaped bracket for securing said exterior speaker to said vehicle.

* * * * *